United States Patent
Gallot et al.

(10) Patent No.: US 11,920,483 B2
(45) Date of Patent: Mar. 5, 2024

(54) METHOD FOR MONITORING THE OPERATING STATE OF A SYSTEM FOR POSITIONING VARIABLE-GEOMETRY MEMBERS OF A TURBOMACHINE

(71) Applicant: SAFRAN HELICOPTER ENGINES, Bordes (FR)

(72) Inventors: Matthieu Julien Gallot, Moissy-Cramayel (FR); Philippe Jean René Marie Benezech, Moissy-Cramayel (FR); Jean-Luc Charles Gilbert Frealle, Moissy-Cramayel (FR); Luc Jacques Pierre Reberga, Moissy-Cramayel (FR); Pascal Rizzo, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 299 days.

(21) Appl. No.: 17/425,389

(22) PCT Filed: Jan. 23, 2020

(86) PCT No.: PCT/FR2020/050096
§ 371 (c)(1),
(2) Date: Jul. 23, 2021

(87) PCT Pub. No.: WO2020/152425
PCT Pub. Date: Jul. 30, 2020

(65) Prior Publication Data
US 2022/0082027 A1    Mar. 17, 2022

(30) Foreign Application Priority Data
Jan. 24, 2019 (FR) ...................... 1900627

(51) Int. Cl.
*F01D 17/26* (2006.01)
*F01D 17/16* (2006.01)
(Continued)

(52) U.S. Cl.
CPC ............ *F01D 17/26* (2013.01); *F01D 17/16* (2013.01); *F01D 21/003* (2013.01); *F02C 7/22* (2013.01);
(Continued)

(58) Field of Classification Search
CPC ........ F01D 17/16; F01D 17/162; F01D 17/26; F01D 21/003; F01D 21/14;
(Continued)

(56) References Cited

U.S. PATENT DOCUMENTS 4,523,286 A * 6/1985 Koga ...................... F01D 17/02
700/289
4,879,662 A * 11/1989 Vicari ...................... G01F 1/26
700/282

(Continued)

FOREIGN PATENT DOCUMENTS

CN    107304716 A    10/2017
FR    2995947 A1    3/2014

*Primary Examiner* — Topaz L. Elliott
*Assistant Examiner* — Jesse M Prager
(74) *Attorney, Agent, or Firm* — BIRCH, STEWART, KOLASCH & BIRCH, LLP

(57) ABSTRACT

The invention concerns a method for monitoring the operating state of a system for positioning variable-geometry members (18) of a turbomachine (10), the members (18) being configured to travel over an operating area comprising a first position P1 and a second position P2, the method comprising the steps of: —(E23) determining a first pivoting speed V1 from the first position P1 to the second position P2; —(E25) determining a second pivoting speed from the second position P2 to the first position P1; and—(E26)

(Continued)

determining an anomaly in the operation of the system for positioning the members (18) if the first speed V1 is lower than a first determined speed threshold and/or if the second speed V2 is lower than a second determined speed threshold.

7 Claims, 4 Drawing Sheets

(51) Int. Cl.
  *F01D 21/00* (2006.01)
  *F02C 7/22* (2006.01)
  *F02C 9/20* (2006.01)
  *F02C 9/54* (2006.01)
(52) U.S. Cl.
  CPC .................. *F02C 9/20* (2013.01); *F02C 9/54* (2013.01); *F05D 2220/323* (2013.01); *F05D 2220/329* (2013.01); *F05D 2270/03* (2013.01); *F05D 2270/44* (2013.01); *F05D 2270/64* (2013.01)
(58) Field of Classification Search
  CPC ......... F05D 2220/323; F05D 2220/329; F05D 2260/80; F05D 2270/03; F05D 2270/309; F05D 2270/44; F05D 2270/64; F04D 27/001; F02C 7/22; F02C 9/20; F02C 9/54

See application file for complete search history.

(56) References Cited

U.S. PATENT DOCUMENTS

| | | |
|---|---|---|
| 6,131,449 A | 10/2000 | Modeen et al. |
| 2012/0325348 A1 | 12/2012 | Heitz et al. |
| 2013/0131951 A1* | 5/2013 | Pandey .................. F01D 5/141 |
| | | 701/100 |
| 2013/0139520 A1* | 6/2013 | Masse .................... F02C 9/263 |
| | | 60/779 |
| 2015/0007713 A1 | 1/2015 | Aki |
| 2015/0285092 A1* | 10/2015 | Chevalier ............ F01D 21/003 |
| | | 415/36 |
| 2016/0123238 A1* | 5/2016 | Kay ........................ F01D 9/041 |
| | | 415/118 |
| 2017/0227424 A1* | 8/2017 | Martucci ................ F02C 7/232 |

* cited by examiner

METHOD FOR MONITORING THE OPERATING STATE OF A SYSTEM FOR POSITIONING VARIABLE-GEOMETRY MEMBERS OF A TURBOMACHINE

BACKGROUND OF THE INVENTION

Field of the Invention

The invention relates to a method for monitoring the operating state of a variable-geometry member of a turbomachine. This method is intended in particular to be implemented for the air inlet vanes of an aircraft engine.

Description of Related Art

Certain aircraft turbomachines, such as helicopter turboshafts, are equipped with air inlet vanes, which serve to optimize the operating point of the engine.

The function of controlling the air inlet vanes, and more generally of variable-geometry members, is the most often provided by a hydraulic actuator, in which the chamber pressures of said actuator are modulated by an electrohydraulic member such as a servo-valve. The servo-valve receives a control current from the computer and is fed hydraulically by a fuel circuit, the pumps of which are driven by the gas generator of the turbomachine.

These vanes, to completely serve their function, must be capable of traveling over their entire useful range, this with the dynamics that is specified. The most rapid speed is rarely demanded, but it is necessary to ensure that it can be reached if necessary.

It is considered that the increase in the force resisting the maneuver of the vanes (due to fouling by sand for example) is a precursor sign of degradation which can lead to the incapacity of the vane, actuator, servo-valve assembly to maintain the specified performance.

Traditionally, a manual maintenance test is carried out regularly to verify the resisting force of the vanes. This test consists of disconnecting the vane kinematics from the actuator, then maneuvering the vanes by hand over their entire useful range, while ensuring that there is no abnormal resisting force. In case of doubt, a torque wrench is used to verify the resistant force level. Starting with a certain threshold, a maintenance action is required (a compressor wash, for example, as a first step).

A solution of this type has as its disadvantage requiring the intervention of an operator at close intervals. Moreover, following an intervention of this type, there exists a risk of incorrectly reconnecting the rod which links the vane kinematics to the actuator. In addition, an intervention of this type requires the removal of an engine to carry out the operation, due to the impossibility of access with the torque wrench.

Also, a solution of this type tests only the resistance on the air entry vane side and not the possible degradation of the actuator, of the supply circuit (the fuel circuit for example) and of the actuator control servo-valve.

BRIEF SUMMARY OF THE INVENTION

The present invention seeks to improve the operation of variable-geometry members in a turbojet which are fed with hydraulic fluid by extraction from the fuel supply circuit of the engine.

The invention thus has as its goal to propose a method for monitoring the operating state of variable-geometry members such as the air inlet vanes of a turbomachine, allowing the previously described disadvantages to be mitigated.

The goal is achieved within the scope of the present invention due to a method for monitoring the operating state of a system for positioning variable-geometry members of a turbomachine, said system comprising variable-geometry members actuated by at least one hydraulic actuator associated with an electrohydraulic member current-controlled by a computer, the power of said hydraulic actuator depending on hydraulic liquid pressures and on the current applied to said electrohydraulic member, said variable-geometry members being configured to travel over an operating range comprising a first position P1 and a second position P2, and for determined hydraulic liquid pressures conditions, said method including the steps of:

- determining a first position P1 of the variable-geometry members;
- applying a command C2 allowing controlling the actuator and bringing the variable-geometry members to the second position P2;
- measuring the pivoting time from the first to the second position and determining a first pivoting speed V1 from the first position P1 to the second position P2;
- applying a first control command C1 allowing bringing the variable-geometry members to the first position P1, once the variable-geometry members have arrived at the second position P2;
- measuring the pivoting time from the second to the first position and determining a second pivoting speed from the second position P2 to the first position P1; and
- determining an anomaly in the operation of the positioning system of the variable-geometry members if the first speed V1 is less than a first determined speed threshold and/or if the second speed V2 is less than a second determined speed threshold.

Advantageously, the monitoring method can also comprise at least one of the following features:

- the application of the command C2 including the injection of a constant control current, determined according to the value of the equilibrium current of the actuator (20);
- the application of the command C1 including the injection of a constant control current, determined according to the value of the equilibrium current of the actuator (20);
- the step of determining a first position P1 of the variable-geometry members includes the application of a command allowing controlling the actuator to bring the variable-geometry members to the first position P1;
- the application of a command allowing controlling the actuator includes the injection of a control current;
- the steps of said method are executed during the deceleration phase following the command to stop the turbomachine;
- the steps of said method are executed under determined and constant conditions of hydraulic liquid pressures at the limits of the actuator;
- the speed thresholds are determined depending on a model of the actuator and of the electrohydraulic member which allows establishing the speed of the actuator depending on a force resisting the displacement of said actuator, this for hydraulic liquid pressures and a control current applied to said electrohydraulic member that are determined;
- one position, of the first and the second position, corresponds to a position of the variable-geometry members where said variable-geometry members are fully open and the other position of the first and the second position corresponds to a position of the variable-geometry members where said variable-geometry members are fully closed;

the hydraulic liquid is fuel from the fuel circuit of the turbomachine, and the electrohydraulic member is a servo-valve of the hydraulic actuator;

the variable-geometry members are air inlet vanes; and the method also includes subsequent steps of, applying a strictly monotonic position setpoint of the variable-geometry members depending on the speed of a gas generator of the turbomachine;

determining the minimum speed of the gas generator for which the position setpoint is satisfied; and determining an anomaly in the operation of the positioning system of the variable-geometry members if the minimum speed is greater than a determined threshold value of the speed of the gas generator.

Advantageously, said method allows establishing automatic rather than manual monitoring, which can be proceeded with at each engine stop.

Said method also allows testing the functionality of any system for controlling the vanes by including the energy source, the actuator and its control means in addition to the mechanism that is controlled.

In addition, said method allows taking advantage of a non-functional phase of the engine (chamber shut down) to accomplish this test in hidden time.

The invention also has as its object a computer program product comprising code instructions for the execution of a method for monitoring the operating state of variable-geometry members of a turbomachine according to one of the features previously described.

BRIEF DESCRIPTION OF THE SEVERAL VIEWS OF THE DRAWINGS

Other features, aims and advantages of the present invention will be revealed upon reading the detailed description that follows, with reference to the appended figures, given by way of non-limiting examples and in which.

DETAILED DESCRIPTION OF THE INVENTION

One embodiment of a method for monitoring the operating state of variable-geometry members in accordance with the invention is described hereafter within the scope of variable-geometry members, such as the air inlet vanes of a gas turbine helicopter engine. However, the field of application of the invention extends to the gas turbine engines of other aircraft, particularly to airplanes and to aircraft engines other than gas turbines engines.

Figure 1:
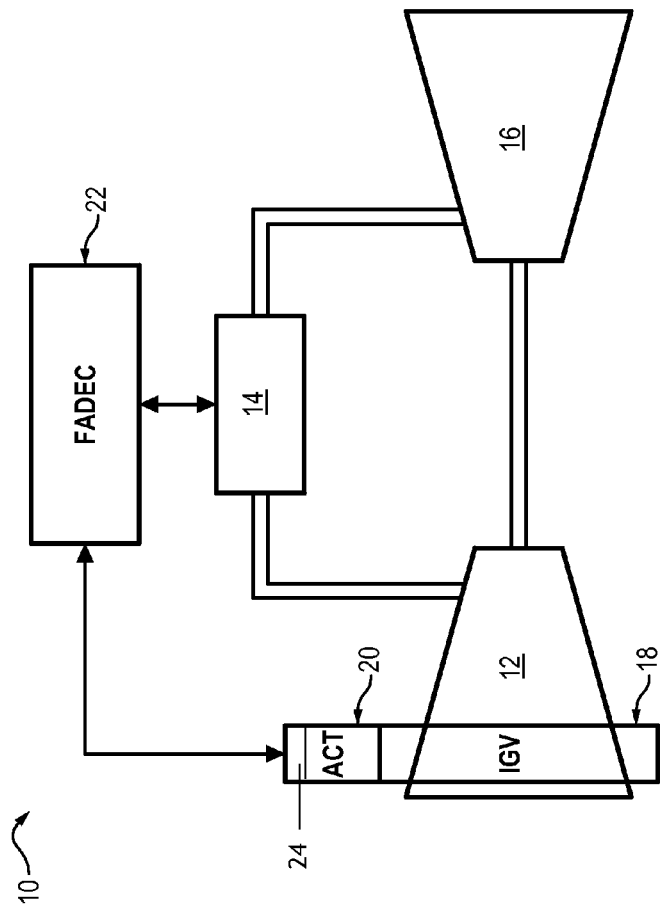
FIG. 1 illustrates schematically a gas turbine engine according to the prior art.

FIG. 1 illustrates schematically a gas turbine engine 10, conventionally comprising a compressor 12, a combustion chamber 14 and a turbine 16 intended to drive the compressor. The compressor-combustion chamber-turbine assembly forms a gas generator.

Air inlet vanes (IGV 18), the positioning of which in rotation is ensured by one or more actuators (ACT 20), are located at the inlet of the compressor 12, controlled from a central computer (FADEC 22) which also provides engine management.

The function of controlling the air inlet vanes 18 is most often provided by a hydraulic actuator in which the chamber pressures of said actuator are modulated by an electrohydraulic member 24 such as a servo-valve. The servo-valve receives a control current from the computer and is fed hydraulically by a fuel circuit, the high-pressure pump of which is driven by the gas generator of the turbomachine.

Figure 2:
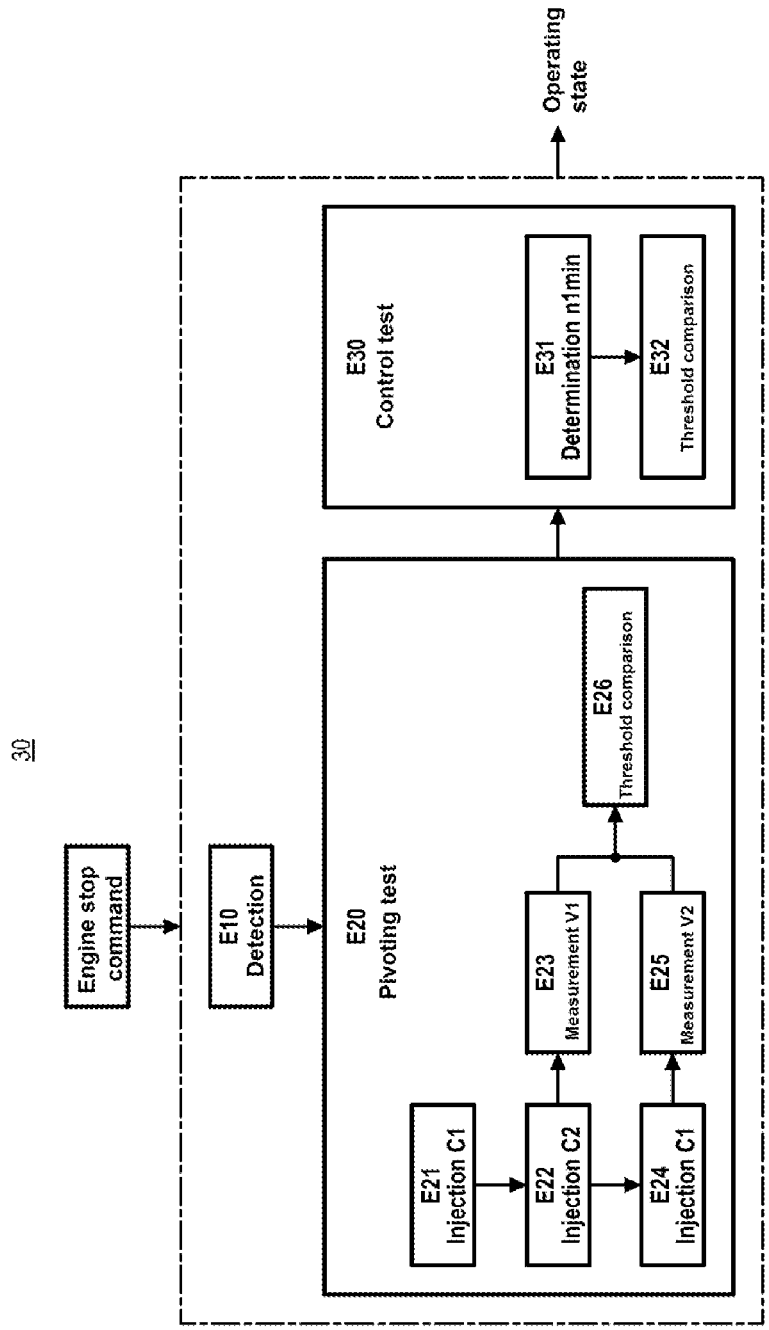
FIG. 2 shows schematically a method for monitoring the operating state of air inlet vanes according to the invention.

With reference to FIG. 2, a method for monitoring the operating state of air inlet vanes is described, implemented by a monitoring module 30.

Advantageously, the monitoring module 30 can be implemented by a computer of the aircraft, or comprises means of connection to said computer. A computer comprises, in known fashion, computer means configured for processing data and implementing computer programs. The computer can be, for example, the central computer (FADEC 22) which is used to manage information on the operation of the engine(s) of the aircraft.

In particular, the monitoring module 30 can be able to convert a received analog measurement of the vanes position into a digital value usable, for example, by a processor or by a Field-Programmable Gate Array (FPGA).

The monitoring module 30 is thus configured to acquire measurements of the position of the vanes, for example by a sensor of the actuator, as well as the rotation speed of the engine, for example of the high pressure (HP) spool of said engine.

Advantageously, the sensors allowing the acquisition of measurements of this type are sensors usually available in the aircraft engine.

In a step E10 of the method, the monitoring module 30 is configured to detect a stoppage of the engine. Following this detection, and therefore during the deceleration of the engine, the monitoring module proceeds with a pivoting test (scanning test) in a step E20.

One precondition for the accomplishment of this test is to have, at the limits of the actuator a known and constant hydraulic liquid (such as the fuel originating in the fuel circuit) pressure over a large area of the engine stop phase.

In the context of the servo-valve, the hydraulic feed circuit is designed in such a manner that it retains at the limits of the control servo-valve a known and constant pressure difference between the feed and the return, over a large area of the deceleration of the engine.

Another precondition is that once the combustion chamber 14 is shut down, it is possible to maneuver the air inlet vanes over a large stroke without damage to the engine or its components.

The vanes are tested to monitor the scanning of a zone defined between a first position P1, and a second position P2.

For example, the first position P1 can correspond to a position of the vanes 18 where they are fully open. The second position P2 can correspond to a position of the vanes 18 where they are fully closed. This position configuration will be contemplated in the continuation of the description.

It is well understood that the positions can be inverted, i.e. the first position P1 corresponding to full closure, and the second position P2 corresponding to full opening of the vanes 18.

The positioning of the vanes can be determined depending on the equilibrium control current, i.e. the control current for obtaining zero speed of the actuator. This equilibrium current is evaluated at each instant by an actuator control program.

Thus, for given feed pressures of the servo-valve and resisting force, the speed of the actuator depends only on the control current.

The vane pivoting test of step E20 takes place in three sub-steps, implemented by the monitoring module 30:

E21: injection of a constant control current C1, determined according to the value of the equilibrium current, to at least one actuator actuating the vanes 18, to bring said vanes 18 to the position P1;

E22: once said vanes 18 have arrived at the position P1, injection of a new constant control current C2, determined according to the value of the equilibrium current, allowing bringing the vanes 18 to the position P2;

E23: a measurement of the pivoting time is accomplished to deduce from it the pivoting speed V1 from position P1 to position P2.

E24: once the vanes 18 have arrived at position P2, reinjection of the first constant control current C1 allowing bringing the vanes 18 to the position P1.

E25: a measurement of the pivoting time is accomplished to deduce from it the pivoting speed V2 from the position P2 to the position P1.

E26: the two speeds measured are compared to a minimum speed threshold which must be achieved under these conditions (fuel pressure/control current).

Likewise, the speeds can be calculated between 2 intermediate points between P1 and P2.

Alternatively, the member for modulating the hydraulic energy to a hydraulic actuator according to a command is not a servo-valve. The control current, allowing positioning the vanes, being replaced by the variable for modulating the speed of the actuator.

Figure 3:
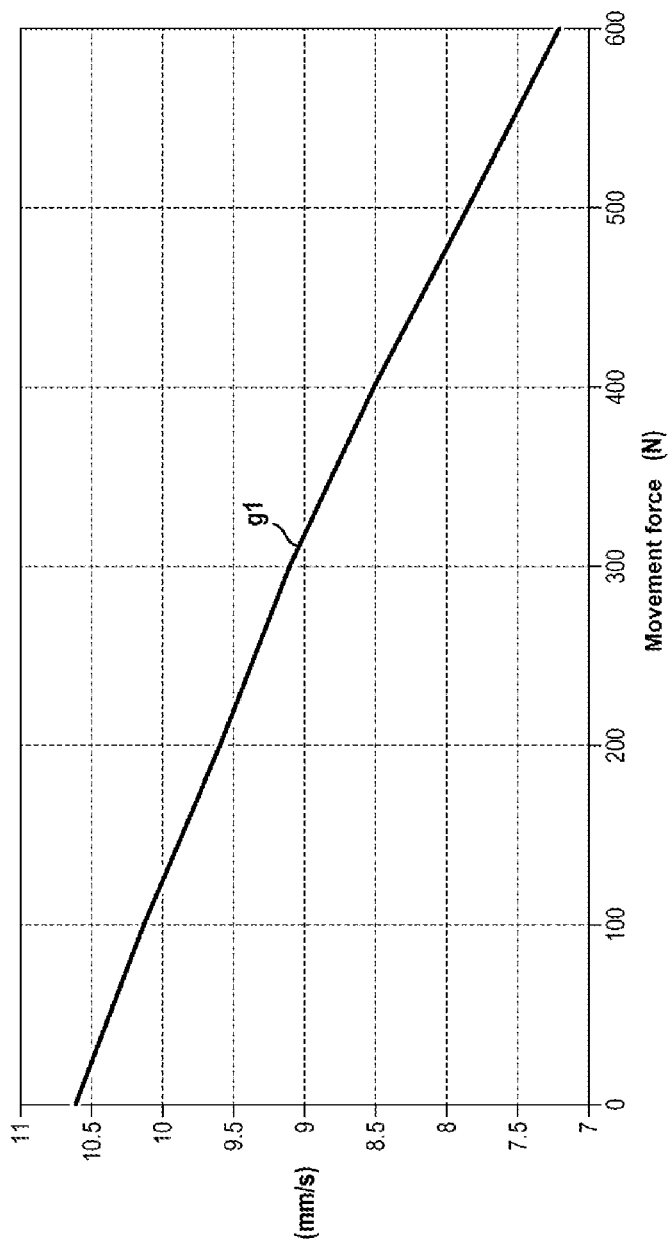
FIG. 3 shows an evolution curve of the speed of the air inlet vanes versus the resistance applied to its movement.

With reference to FIG. 3, and more particularly to curve g1, this minimum speed threshold originates in the identification of an actuator model which allows establishing the speed of the actuator depending on the resisting force which is applied to it during movement, this for given conditions of fuel pressure and control current (determined according to the value of the equilibrium current).

Besides comparison to a threshold, the measured pivoting times and/or the calculated speeds during each stop can be stored, for example in a memory zone of the computer, in order to accomplish trend tracking allowing tracking the evolution of the margin between the locomotion of the actuator and the resisting force of the variable geometry, and thus to anticipate maintenance actions.

Successively with the test of step E20, the monitoring module 30 is configured to detect stoppage of the engine, and to implement a control test in step E30.

In fact, during the engine deceleration, at a very low rotation speed of the gas generator, the HP pump of the feed circuit no longer allows maintaining the constant pressure difference. In this phase, the pressure conditions at the actuator are considerably reduced while being dependent on the rotation speed and the state of the HP pump. A point is therefore reached where these conditions are insufficient to cause the actuator to move. The purpose of this test is precisely to determine this moment. To this end, following the pivoting test E20, in a step E31, the vanes are again regulated to their position setpoint depending on the speed of the gas generator n1 (curve g5-FIG. 4).

Figure 4A:
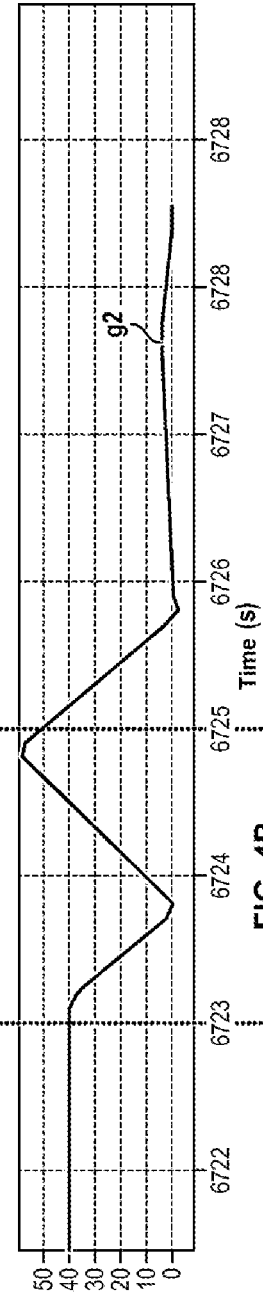
FIGS. 4A, 4B, 4C shows simultaneous time evolution curves of, respectively, the position of the vanes, the equilibrium current of the vanes, the control current applied to the hydraulic actuator, the speed of the gas generator of the turbomachine, for the implementation of the monitoring method according to the invention.
Figure 4B:
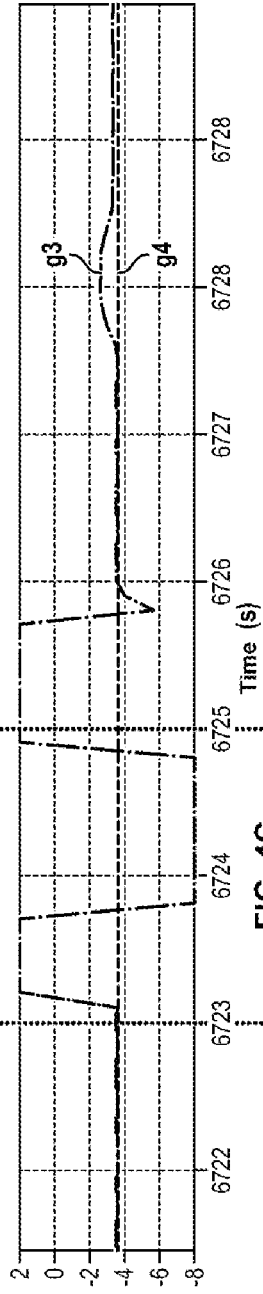
Figure 4C:
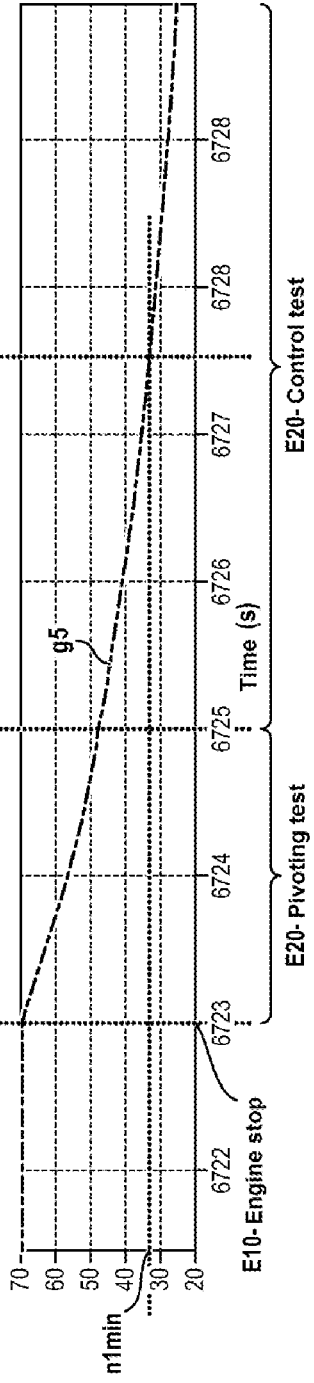

Also with reference to FIG. 4, it is illustrated as a function of the resistive force opposed to the displacement, the time evolution of the position of the vanes 18 (curve g2) simultaneously with a control current applied to the hydraulic actuator activating said vanes 18 (curve g3).

The monitoring module 30 applies a strictly monotonic vane position setpoint as a function of n1, by injecting in the actuator a control current allowing regulating the position of the vanes. Ideally, the error between the position setpoint and the real position of the vanes 18 is small, the control current is near the equilibrium current of the vanes (curve g4).

The monitoring module 30 determines until what minimum value n1 min of n1, the air inlet vanes can be controlled by a strictly monotonic actuator position control law as a function of n1.

Said value n1 min corresponds to the value n1 determined at the instant when the vanes 18 freeze (actuator speed zero) and consequently where the control law is no longer followed; in fact, as the vanes 18 can no longer follow the control law, the error between the setpoint and the real position of the vanes 18 increases and the control current therefore deviates from the equilibrium current.

Alternatively, n1 min can be deduced from the final position of the vanes and from the actuator position control law applied at the end of the engine deceleration.

Thereafter, in a step E32, this value n1 min can be compared to a threshold or be the subject of trend tracking allowing anticipating a maintenance action.

The proposed monitoring method an also apply to other type of variable-geometry members, for example discharge valves, etc.

Discharge valves allow discharging the compressor, and thus moving away from the pumping line. They are generally open at low speeds to free acceleration capacity, then closed at higher speeds to optimize the efficiency of the engine. For example, the discharge valves are progressive valves.

The latter are servo-valves the position of which can occupy any point in the area between fully open and fully closed. They are controlled by the computer via a control current. Progressive valves are therefore controlled in the same manner as the air inlet vanes.

The invention claimed is:

1. A method for monitoring an operating state of a system for positioning variable-geometry members of a turbomachine, said system comprising the variable-geometry members actuated by at least one hydraulic actuator associated with an electrohydraulic member current-controlled by a computer, a power of said hydraulic actuator depending on hydraulic liquid pressures and on a current applied to said electrohydraulic member, said variable-geometry members being configured to travel over an operating range comprising a first position P1 and a second position P2, and the method including during a deceleration phase following a command to stop the turbomachine:
a) a pivoting test implemented for hydraulic liquid pressure conditions that are determined and constant at limits of the actuator, the pivoting test including:
determining the first position P1 of the variable-geometry members;
applying a command C2 allowing controlling the actuator and bringing the variable-geometry members to the second position P2, the application of the command C2 including an injection of a second constant control current, determined according to a value of an equilibrium current of the actuator;

measuring a pivoting time from the first position P1 to the second position P2 and determining a first pivoting speed V1 from the first position P1 to the second position P2;

applying a first control command C1 allowing bringing the variable-geometry members to the first position P1, once the variable-geometry members have arrived at the second position P2, the application of the command C1 including an injection of a first constant control current, determined according to a value of an equilibrium current of the actuator;

measuring a pivoting time from the second position P2 to the first position P1 and determining a second pivoting speed V2 from the second position P2 to the first position P1; and determining an anomaly in the operation of the positioning system of the variable-geometry members if the first pivoting speed V1 is less than a first determined speed threshold and/or if the second pivoting speed V2 is less than a second determined speed threshold, b) then a control test including:

applying a strictly monotonic position setpoint of the variable-geometry members depending on a speed of a gas generator of the turbomachine and determining a minimum speed of the gas generator for which the position setpoint is satisfied; and determining an anomaly in the operation of the positioning system of the variable-geometry members if the minimum speed is greater than a determined threshold value of the speed of the gas generator.

2. The monitoring method according to claim 1, wherein the step of determining the first position P1 of the variable-geometry members includes an application of a command allowing controlling the actuator to bring the variable-geometry members to the first position P1.

3. The monitoring method according to claim 1, wherein the speed thresholds are determined depending on a model of the actuator and of the electrohydraulic member which allows establishing the speed of the actuator depending on a force resisting the displacement of said actuator, this for constant hydraulic liquid pressures and a constant control current applied to said electrohydraulic member that are determined.

4. The monitoring method according to claim 1, wherein one position, of the first and the second position, corresponds to a position of the variable-geometry members where said variable-geometry members are fully open and the other position of the first and the second position corresponds to a position of the variable-geometry members where said variable-geometry members are fully closed.

5. The monitoring method according to claim 1, wherein the hydraulic liquid is fuel from a fuel circuit of the turbomachine, and the electrohydraulic member is a servo-valve of the hydraulic actuator.

6. The monitoring method according to claim 1, wherein the variable-geometry members are air inlet vanes.

7. A non-transitory computer program product comprising code instructions for an execution of the method according to claim 1, by the computer of the turbomachine.

* * * * *